United States Patent [19]
Golnabi et al.

[11] Patent Number: 6,044,390
[45] Date of Patent: Mar. 28, 2000

[54] RECURSIVE LOOKAHEAD-BASED $2^N$-BIT SERIAL MULTIPLIERS OVER GALOIS FIELD GF ($2^M$)

[75] Inventors: Habibollah Golnabi, Plano, Tex.; Inderpal Deol, San Jose, Calif.

[73] Assignee: V L S I Technology, Inc., San Jose, Calif.

[21] Appl. No.: 09/061,820

[22] Filed: Apr. 16, 1998

[51] Int. Cl.[7] .................................................... G06F 7/00
[52] U.S. Cl. .......................................................... 708/492
[58] Field of Search ................................... 708/491, 492, 708/620, 625, 627

[56] References Cited

U.S. PATENT DOCUMENTS

| | | | |
|---|---|---|---|
| 4,251,875 | 2/1981 | Marver et al. .......................... | 708/492 |
| 4,797,848 | 1/1989 | Walby ..................................... | 708/492 |
| 5,742,530 | 4/1998 | Gressel et al. .......................... | 708/491 |
| 5,818,855 | 10/1998 | Foxcroft ................................. | 714/759 |

*Primary Examiner*—Chuong Dinh Ngo
*Attorney, Agent, or Firm*—Burns, Doane, Swecker & Mathis, L.L.P.

[57] ABSTRACT

The present invention is a $2^n$-bit serial multiplier design optimized for both speed and silicon area. The multiplier design includes source registers, recursive multiplication logic, and destination registers. According to the method of the present invention, the $2^n$-bit serial multiplier design is implemented by performing a precomputing (cycle-stealing) step in which source registers are preloaded with the recursively reconstructed and zero-padded input data and the designation registers are preloaded with zeros or the highest input field coefficient while the first cycle of the multiplication phase is taking place.

9 Claims, 5 Drawing Sheets

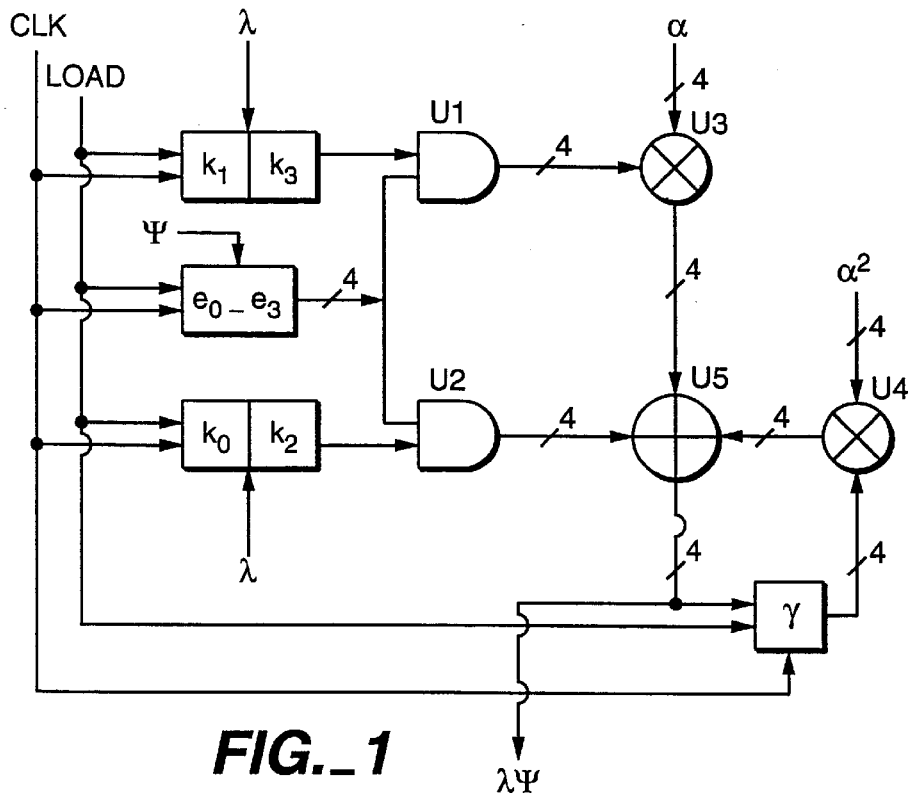
FIG._1
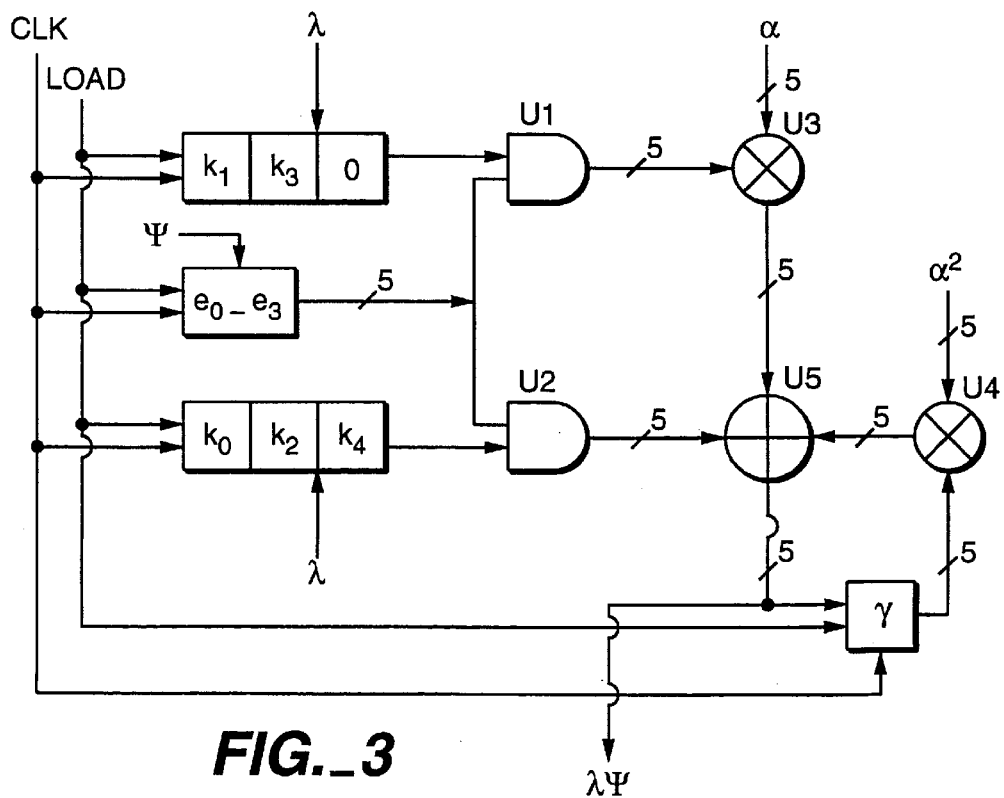
FIG._3

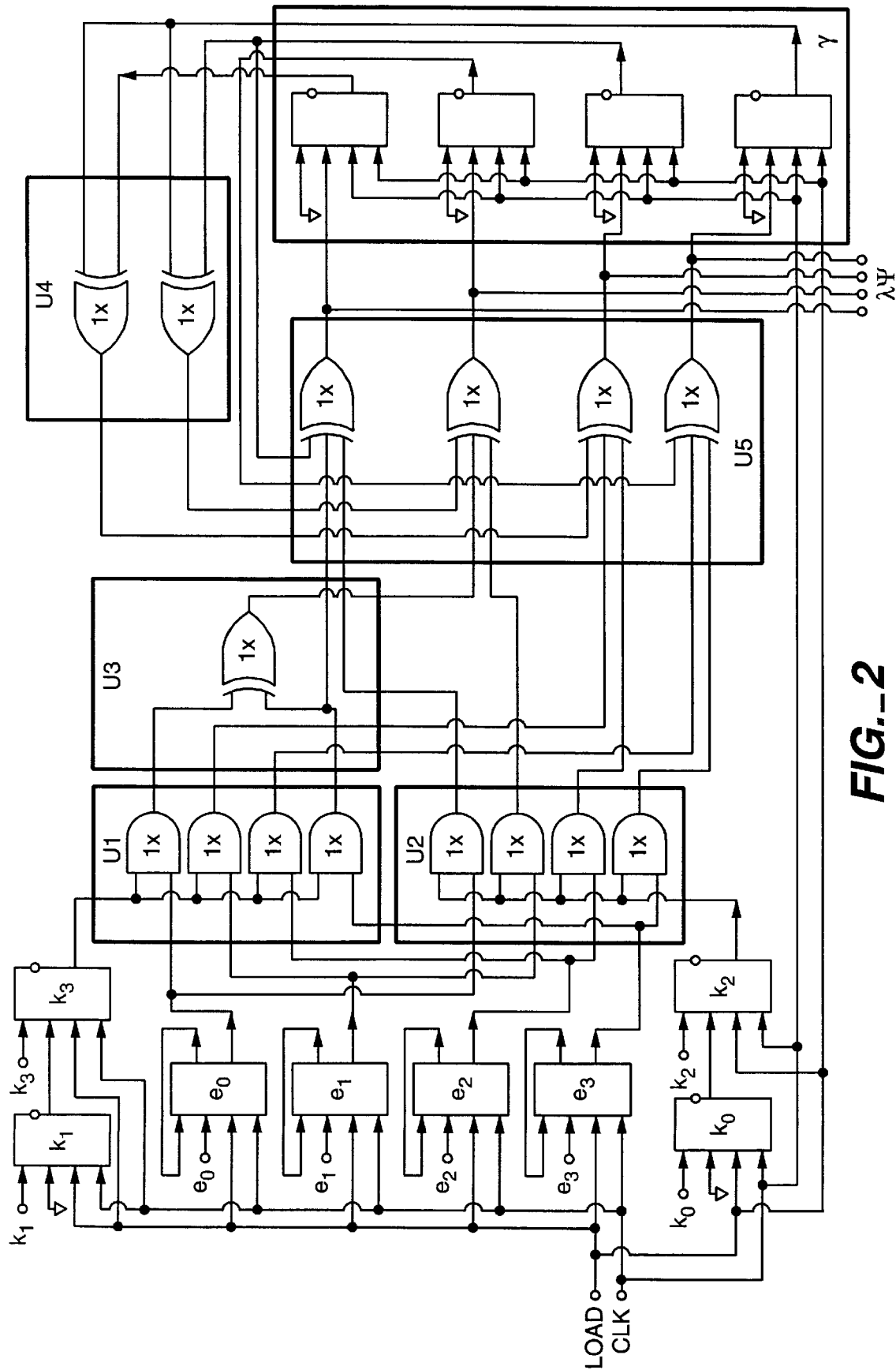
FIG._2

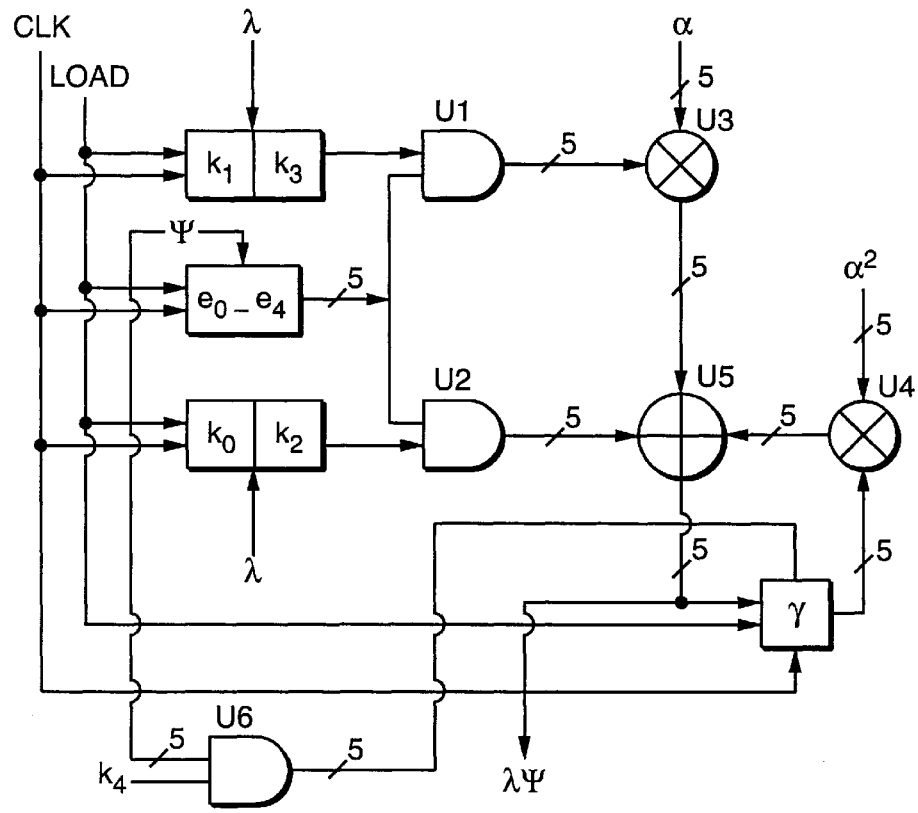
FIG._4
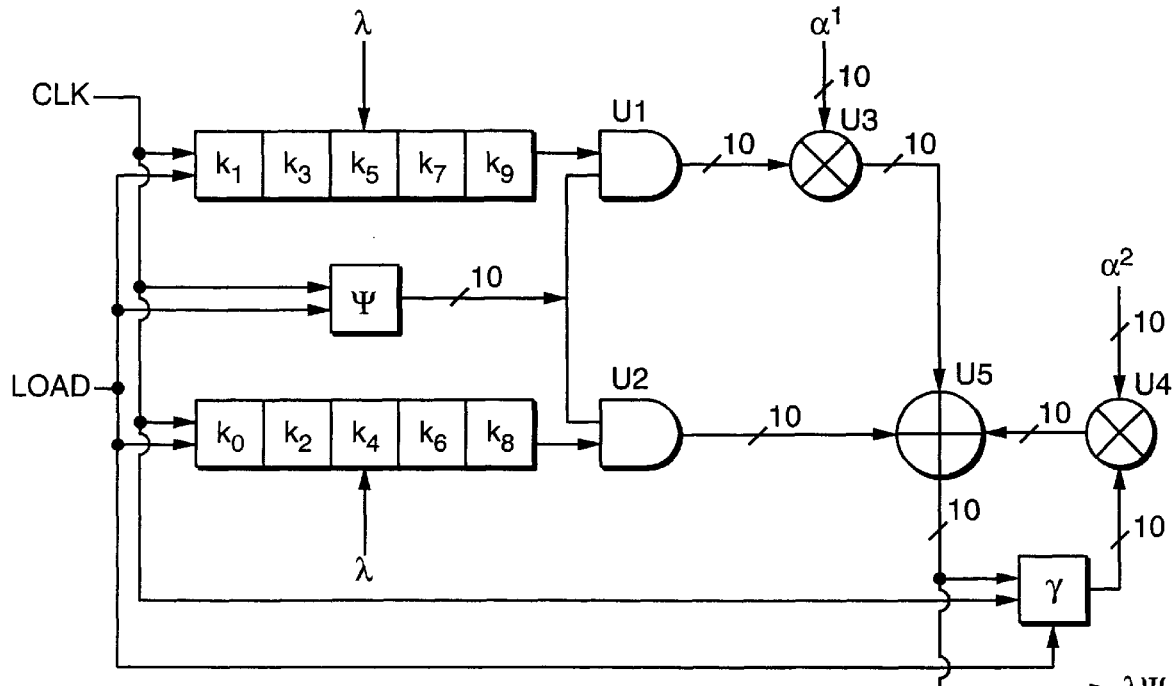
FIG._5

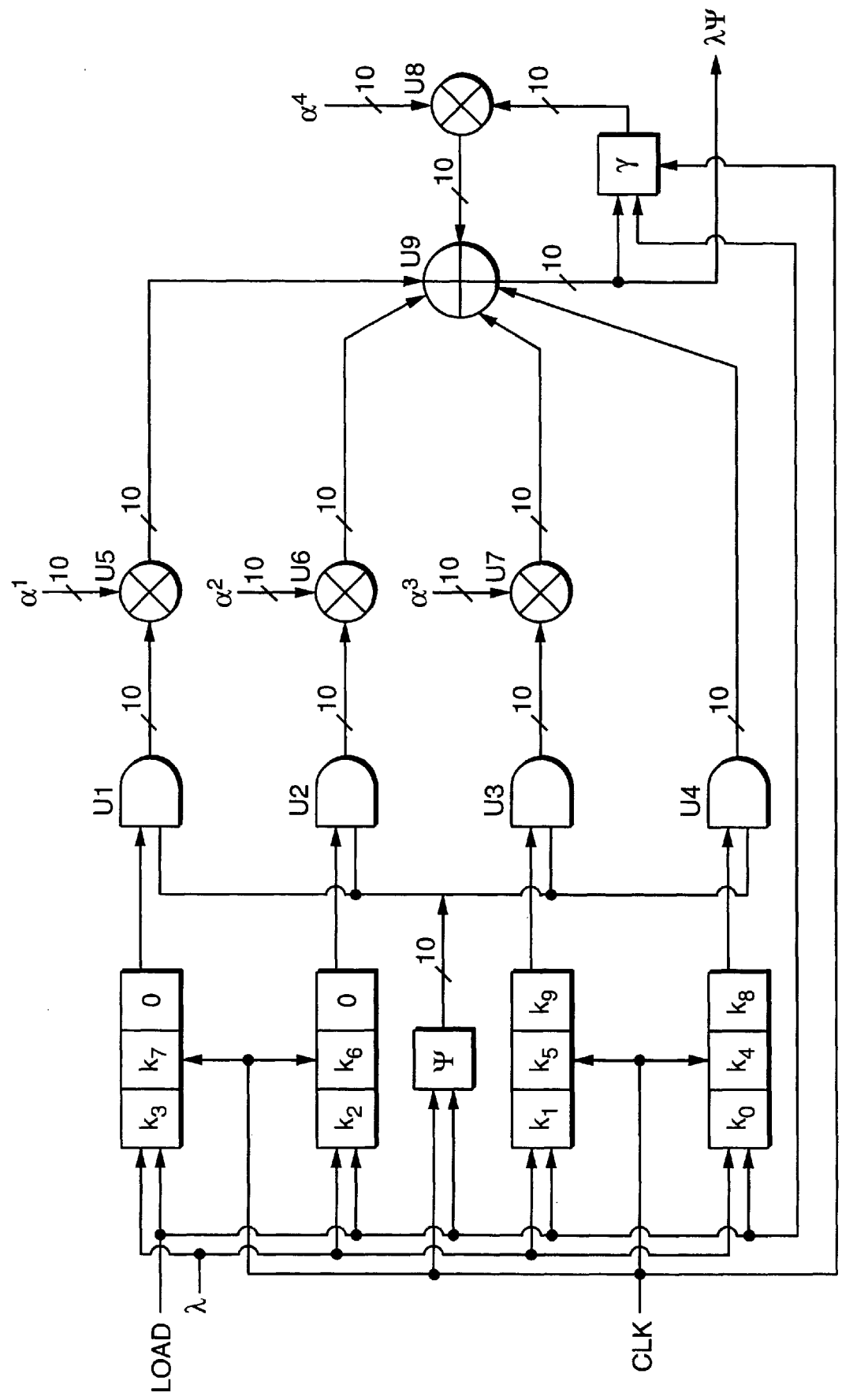
FIG._6

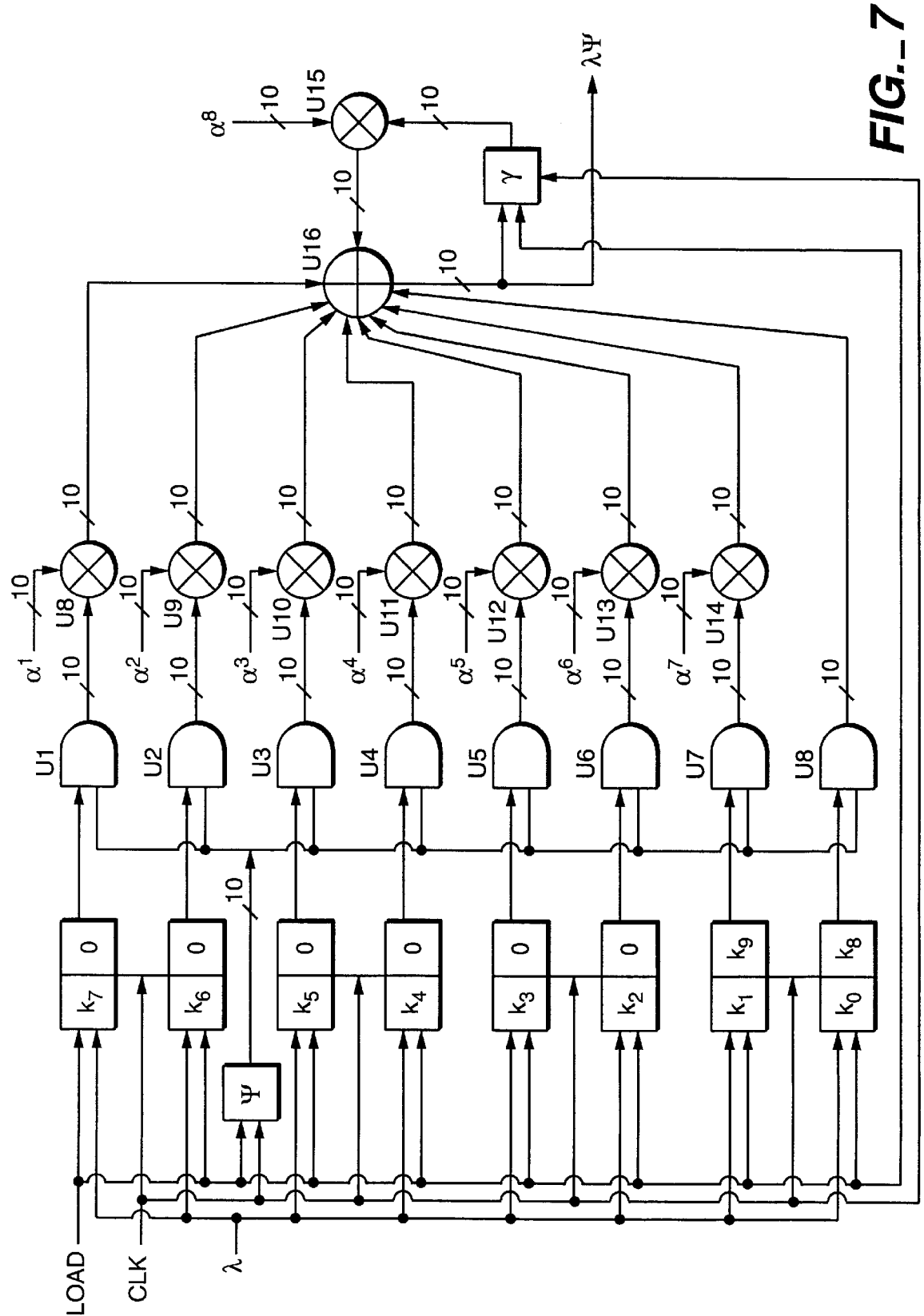
FIG._7

RECURSIVE LOOKAHEAD-BASED $2^N$-BIT SERIAL MULTIPLIERS OVER GALOIS FIELD GF ($2^M$)

BACKGROUND OF THE INVENTION

1. Field of the Invention

The present invention relates generally to the multiplications of finite field elements, in applications where error correction capabilities are required, and more particularly to bit-serial multipliers used to perform multiplications of field elements over Galois Field GF ($2^m$).

2. State of the Art

Finite (or Galois) fields can be applied to many areas of electrical system designs including error correcting codes, switching theory, and digital signal processing. In general, the application of Galois Fields in these areas (and particularly multiplication in Galois Fields) is one in which a derived mathematical algorithm in some Galois Field is implemented using logic elements to obtain-a desired function or result from the system. A multiplication operation performed in Galois Fields is implemented using logic elements referred to as multipliers, which perform logical operations on the input data to generate output data representing the result of the multiplication of the input data elements.

One example of a multiplier for finite field elements is a fully combinational parallel logic multiplier as described in "Systolic Multipliers for Finite Fields GF($2^m$)," by C. S. Yeh, Irving S. Reed, and T. K. Troung, IEEE Transactions on Computers, Vol. C-33, No. 4, April 1984 and incorporated herein. A fully combinational logic design does not include any sequential logic and hence must perform all intermediate steps. As a result, this type of multiplier includes a significant number of logic gates to implement it. Two examples of a bit serial multiplier are shown in "Efficient Bit-Serial Multiplication and the Discrete-Time Wiener-Hopf Equation Over Finite Fields," by M. Kasahara, M. Morii, and D. L. Whiting, IEEE Transactions on Information Theory, Vol. 35, No. 6, pp. 1177–1183, November 1989, and in "Encoder Using Berlekamp's Bit-Serial Multiplier Algorithm," by L. Deutsch, I. S. Reed, T. K. Troung, K. Wang, C. Yeh, IEEE Transactions on Computers, Vol. C-33, No. 10, pp. 906–911, October 1984, both incorporated herein. Bit serial multiplier designs reduce the number of required logic gates by reusing gates in a reiterative manner and pipelining to perform the multiplication operation.

As the bandwidth requirement of communication devices increases and hence the number of elements involved in the multiplication operations, there is a need for faster multiplication operations and multipliers which use minimum silicon area. A multiplier that is designed with fully combinational logic, uses large numbers of logic gates to perform a quick parallel multiplication. However, the speed at which the parallel multiplier described in "Systolic Multipliers for Finite Fields GF($2^m$)" performs the multiplication is at the expense of large silicon area consumption. Bit-serial multiplier designs minimize silicon area use however, at the expense of reduced performance. The disadvantages associated with both of these schemes are that the performance vs. silicon area is not optimized to yield the best design solution.

The goal of the present invention is to implement a $2^n$-bit serial multiplier design that performs fast multiplications of two arbitrary field elements $\lambda$ and $\psi$ over the Galois Field, GF ($2^m$) using minimal silicon area.

SUMMARY OF THE INVENTION

The present invention is a $2^n$-bit serial multiplier design for multiplying two arbitrary field elements optimized for both speed and silicon area. The multiplier design includes a precomputing stage, source registers, a Galois Field type recursive multiplication stage, and destination registers. According to the method of the present invention, the $2^n$-bit serial multiplier design is implemented by performing a precomputing (cycle-stealing) step in which source registers are pre-loaded with reconstructed and zero-padded input data prior to performing recursive multiplication and the destination registers are pre-loaded with zeros or the highest order field coefficient of the arbitrary field elements while the first cycle of the recursive multiplication phase is taking place. The result of each recursive multiplication cycle is loaded into the destination register and used in subsequent recursive multiplication cycles or in the case of the final cycle, the contents of the destination register is the product of the two field elements. By implementing a multiplier design according to the present invention, a faster $2^n$-bit serial multiplier can be realized. As a result, since multiplication is performed faster, a $2^n$-bit serial multiplier having an increased exponent value n can also be realized.

BRIEF DESCRIPTION OF THE DRAWINGS

The present invention may be further understood from the following written description in conjunction with the appended drawings. In the drawings:

FIG. 1 shows a first implementation of a $2^n$-bit serial multiplier over Galois Field GF ($2^m$) with n=1 and m=4 in accordance with the present invention;

FIG. 2 shows a second implementation of a $2^n$-bit serial multiplier over Galois Field GB ($2^m$) with n=1 and m=4 in accordance with the present invention.

FIG. 3 shows a third implementation of a $2^n$-bit serial multiplier over Galois Field GF ($2^m$) with n=1 and m=5 in accordance with the present invention.

FIG. 4 shows a fourth implementation of a $2^n$-bit serial multiplier over Galois Field GF ($2^m$) with n=1 and m=5 in accordance with the present invention.

FIG. 5 shows a fifth implementation of a $2^n$-bit serial multiplier with n=1 over the Galois Field ($2^{10}$).

FIG. 6 shows a sixth implementation of a $2^n$-bit serial multiplier with n=2 over the Galois Field ($2^{10}$).

FIG. 7 shows a seventh implementation of a $2^n$-bit serial multiplier with n=3 over the Galois Field ($2^{10}$).

DETAILED DESCRIPTION OF THE PREFERRED EMBODIMENTS

In general, the system and method of the present invention is designed to perform Galois Field serial bit multiplications of two arbitrary field elements $\beta$ and $\psi$.

Let GF ($2^m$) be the finite field of $2^m$ elements. Also, let $\beta$ and $\psi$ be two arbitrary field elements having length m over the Galois Field GF ($2^m$) as defined below:

$$\beta = \sum_{i=0}^{m-1} k_i \alpha^i \tag{1}$$

$$\Psi = \sum_{i=0}^{m-1} e_i \alpha^i \tag{2}$$

where $k_i$ and $e_i$ are two arbitrary field coefficients and $\alpha^i$ indicates arbitrary field position of the $\beta$ and $\psi$ field elements. The following three steps describe a novel algorithm for one embodiment of the $2^n$-bit serial multiplication of the input field elements $\beta$ and $\psi$ over the Galois Field GF ($2^m$).

Step 1) Decomposition of β input field element

Let δ be a new input field element of length m that is resulted from the decomposition of the β input field element. The decomposition takes the exponent value, n, of the $2^n$-bit serial multipliers into the consideration for deriving a general formula.

$$\delta = \sum_{i=0}^{m-1} k_i \alpha^i \tag{3}$$

i) in the case when the length m is even, then δ is:

$$\delta(even) = \sum_{i=0}^{2^n-1} k_i \alpha^i + \sum_{i=2^n}^{2 \cdot 2^n-1} k_i \alpha^i + \sum_{i=2 \cdot 2^n}^{3 \cdot 2^n-1} k_i \alpha^i + \dots + \sum_{i=m-2 \cdot 2^n}^{m-2^n-1} k_i \alpha^i + \sum_{i=m-2^n}^{m-1} k_i \alpha^i \tag{4}$$

and δ can be restructured as:

$$\delta(even) = \sum_{i=0}^{2^n-1} k_i \alpha^i + \alpha^{2^n} \sum_{i=2^n}^{2 \cdot 2^n-1} k_i \alpha^{i-2^n} + \alpha^{2 \cdot 2^n} \sum_{i=2 \cdot 2^n}^{3 \cdot 2^n-1} k_i \alpha^{i-2 \cdot 2^n} + \dots + \alpha^{(m-2 \cdot 2^n)} \sum_{i=m-2 \cdot 2^n}^{m-2^n-1} k_i \alpha^{i-(m-2 \cdot 2^n)} + \alpha^{(m-2^n)} \sum_{i=m-2^n}^{m-1} k_i \alpha^{i-(m-2^n)} \tag{5}$$

ii) in the case when the length m is odd, then δ is:

$$\delta(odd) = \sum_{i=0}^{2^n-1} k_i \alpha^i + \sum_{i=2^n}^{2 \cdot 2^n-1} k_i \alpha^i + \sum_{i=2 \cdot 2^n}^{3 \cdot 2^n-1} k_i \alpha^i + \dots + \sum_{i=m-2 \cdot 2^n+1}^{m-2^n} k_i \alpha^i + k_{m-1} \alpha^{m-1} \tag{6}$$

and δ can be restructured as:

$$\delta(odd) = \sum_{i=0}^{2^n-1} k_i \alpha^i + \alpha^{2^n} \sum_{i=2^n}^{2 \cdot 2^n-1} k_i \alpha^{i-2^n} + \alpha^{2 \cdot 2^n} \sum_{i=2 \cdot 2^n}^{3 \cdot 2^n-1} k_i \alpha^{i-2 \cdot 2^n} + \dots + \alpha^{(m-2 \cdot 2^n+1)} \sum_{i=m-2 \cdot 2^n+1}^{m-2^n} k_i \alpha^{i-(m-2 \cdot 2^n+1)} + k_{m-1} \alpha^{m-1} \tag{7}$$

Hence, depending on the length m of the field element, it can be represented by a restructured odd or even field element δ, as indicated in equations (5) and (7).

Step 2) Zero-padding

Let Φ be a zero-padded field element of length $\{2^n-m \pmod{2^n}+1\}$ where n is the exponent value of the $2^n$-bit serial multipliers and m is the length of β input field element then:

$$\Phi = \sum_{p=0}^{2^n-m(mod\,2^n)} k_{p+m} \alpha^{p+m} \tag{8}$$

Expanding equation (8) gives:

$$\Phi = k_m \alpha^m + k_{1+m} \alpha^{1+m} + \dots + k_{2^n-m(mod\,2^n)+m} \alpha^{2^n-m(mod\,2^n)+m} \tag{9}$$

Next, a new input field element λ is derived by adding the restructured odd or even input field element, δ(odd) or δ(even), to the zero-padded field element Φ as shown below:

$$\lambda = \delta(odd\ or\ even) + \Phi \tag{10}$$

The length of the zero-padded input field element X is also m since the following applies:

$$k_l = 0 \text{ for } l > m-1 \tag{11}$$

The $2^n$-bit serial multiplication of the restructured zero-padded input field element λ with the input field element ψ is obtained by using (10):

$$\lambda \psi = \delta(odd\ or\ even) \cdot \psi + \Phi \cdot \psi \tag{12}$$

Step 3) Recursive structuring

The recursive structuring is based on the following principle:

i) If m is even, $m \pmod{2^n} = 2^n - 2s$.

ii) If m is odd, $m \pmod{2^n} = 2^n - (2s+1)$.

where $s = 0, 1, 2, \dots, (2^{n-1}-1)$ and n is a positive integer.

The number of multiplication cycles for a $2^n$-bit serial multiplier is determined by using the following criteria:

i) The number of multiplication cycles in general for m odd or even is given by $(m+h)/2^n$ where $h = \{2^n - m \pmod{2^n}\}$.

ii) However, if m is odd and $m \pmod{2^n} = 1$, the number of multiplication cycles can be reduced to $(m-1)/2^n$.

For an example, Equation (12) can be recursively structured into $2^n$-bit serial multipliers with $n=1$.

a) $2^n$-bit serial multipliers with $n=1$ i) with m (even); s=0; h=0; $m \pmod{2^n}=2$ Using Equations (5) and (9) in (12), λψ is:

$$\lambda \Psi = \Psi \sum_{i=0}^{1} k_i \alpha^i + \Psi \alpha^2 \sum_{i=2}^{3} k_i \alpha^{i-2} + \Psi \alpha^4 \sum_{i=4}^{5} k_i \alpha^{i-4} + \dots + \Psi \alpha^{(m-4)} \sum_{i=m-4}^{m-3} k_i \alpha^{i-(m-4)} + \Psi \alpha^{(m-2)} \sum_{i=m-2}^{m-1} k_i \alpha^{i-(m-2)} + \Psi k_m \alpha^m \tag{13}$$

λψ is recursively structured as follows:

$$\lambda \Psi = \left(\left(\dots\left(\Psi k_m \alpha^2 + \Psi\left(\sum_{i=m-2}^{m-1} k_i \alpha^{i-(m-2)}\right)\right)\alpha^2 + \Psi\left(\sum_{i=m-4}^{m-3} k_i \alpha^{i-(m-4)}\right)\right)\alpha^2 + \dots + \Psi\left(\sum_{i=2}^{3} k_i \alpha^{i-2}\right)\right)\alpha^2 + \Psi\left(\sum_{i=0}^{1} k_i \alpha^i\right) \tag{14}$$

Using equation (11), $k_m = 0$ and λψ is:

$$\lambda \Psi = ((\dots(0\,\alpha^2 + \Psi(k_{m-1}\alpha + k_{m-2}))\alpha^2 + \Psi(k_{m-3}\alpha + k_{m-4}))\alpha^2 + \dots + \Psi(k_3\alpha + k_2))\alpha^2 + \Psi(k_1\alpha + k_0) \tag{15}$$

Given that it takes $(m+h)/2^n$ multiplication cycles as stated above (for $h = \{2^n - m \pmod{2^n}\}$), it takes $m/2$ clock cycles to do a $2^n$-bit serial multiplication when m is (even), $n=1$ and $m \pmod{2^n} = 2$.

ii) with m (odd); s=0; h=1; $m \pmod{2^n}=1$

Using Equations (7) and (9) in (12), the following is resulted:

$$\lambda\Psi = \Psi\sum_{i=0}^{1} k_i\alpha^i + \Psi\alpha^2\sum_{i=2}^{3} k_i\alpha^{i-2} + \Psi\alpha^4\sum_{i=4}^{5} k_i\alpha^{i-4} + \ldots + \qquad (16)$$

$$\Psi\alpha^{(m-3)}\sum_{i=m-3}^{m-2} k_i\alpha^{i-(m-3)} + \Psi k_{m-1}\alpha^{m-1} + \Psi k_m\alpha^m + \Psi k_{m+1}\alpha^{m+1}$$

The above equation is put into a recursive format as:

$$\lambda\Psi = \left(\left(\ldots(\Psi k_{m+1}\alpha^2 + \Psi(k_m\alpha + k_{m-1}))\alpha^2 + \Psi\left(\sum_{i=m-4}^{m-3} k_i\alpha^{i-(m-4)}\right)\right)\alpha^2 + \qquad (17)$$

$$\ldots + \Psi\left(\sum_{i=2}^{3} k_i\alpha^{i-2}\right)\right)\alpha^2 + \Psi\left(\sum_{i=0}^{1} k_i\alpha^i\right)$$

Using equation (11), $k_m=0$ and $\lambda\psi$ is:

$$\lambda\Psi = ((\ldots(0\alpha^2 + \Psi(0\alpha + k_{m-1}))\alpha^2 + \Psi(k_{m-2}\alpha + k_{m-3}))\alpha^2 + \qquad (18)$$
$$\ldots + \Psi(k_3\alpha + k_2))\alpha^2 + \Psi(k_1\alpha + k_0)$$

Given that it takes $(m-1)/2^n$ multiplication cycles as stated above, then it takes $$\frac{m+1}{2}$$

clock cycles to do a $2^n$-bit serial multiplication when m is (odd), n=1 and m(mod $2^n$)=1.
Equation (18) can be further simplified as:

$$\lambda\Psi = ((\ldots(\Psi k_{m-1})\alpha^2 + \Psi(k_{m-2}\alpha + k_{m-3}))\alpha^2 + \ldots + \Psi(k_3\alpha + k_2))\alpha^2 + \qquad (19)$$
$$\Psi(k_1\alpha + k_0)$$

This change speeds up the multiplication. It now takes $$\frac{m-1}{2}$$

clock cycles to do a $2^n$-bit serial multiplication when m is (odd), n=1 and m(mod $2^n$)=1.
The same justification can be made to derive recursive equations for the $2^n$-bit serial multipliers with n=2 and n=3.
b) $2^n$-bit serial multipliers with n=2
  i) with m (even); s=0; h=0; m(mod $2^n$)=4, and using equations (5), (9), and (12):

$$\lambda\Psi = ((\ldots(0\alpha^4 + \Psi(k_{m-1}\alpha^3 + k_{m-2}\alpha^2 + k_{m-3}\alpha + k_{m-4}))\alpha^4 + \qquad (20)$$
$$\Psi(k_{m-5}\alpha^3 + k_{m-6}\alpha^2 + k_{m-7}\alpha + k_{m-8}))\alpha^4 +$$
$$\ldots + \Psi(k_3\alpha^3 + k_2\alpha^2 + k_1\alpha + k_0);$$

$$\frac{m}{4}$$

clock cycles are required to do a $2^n$-bit serial multiplication.
  ii) m (odd); s=0; h=1; m(mod $2^n$)=3, and using equations (7), (9), and (12):

$$\lambda\Psi = ((\ldots(0\alpha^4 + \Psi(0\alpha^3 + k_{m-1}\alpha^2 + k_{m-2}\alpha + k_{m-3}))\alpha^4 + \qquad (21)$$
$$\Psi(k_{m-4}\alpha^3 + k_{m-5}\alpha^2 + k_{m-6}\alpha + k_{m-7}))\alpha^4 +$$
$$\ldots + \Psi(k_3\alpha^3 + k_2\alpha^2 + k_1\alpha + k_0);$$

$$\frac{m+1}{4}$$

clock cycles are required to do a $2^n$-bit serial multiplication.
  iii) m (even); s=1; h=2; m(mod $2^n$)=2

$$\lambda\Psi = ((\ldots(0\alpha^4 + \Psi(0\alpha^3 + 0\alpha^2 + k_{m-1}\alpha + k_{m-2}))\alpha^4 + \qquad (22)$$
$$\Psi(k_{m-3}\alpha^3 + k_{m-4}\alpha^2 + k_{m-5}\alpha + k_{m-6}))\alpha^4 +$$
$$\ldots + \Psi(k_3\alpha^3 + k_2\alpha^2 + k_1\alpha + k_0)$$

$$\frac{m+2}{4}$$

clock cycles are required to do a $2^n$-bit serial multiplication.
  iv) m (odd); s=1; h=3; m)mod $2^n$)=1

$$\lambda\Psi = ((\ldots(\Psi k_{m-1})\alpha^4 + \Psi(k_{m-2}\alpha^3 + k_{m-3}\alpha^2 + k_{m-4}\alpha + k_{m-5}))\alpha^4 + \qquad (23)$$
$$\ldots + \Psi(k_3\alpha^3 + k_2\alpha^2 + k_1\alpha + k_0)$$

$$\frac{m-1}{4}$$

clock cycles are required to do a $2^n$-bit serial multiplication.
c) $2^n$-bit serial multipliers with n=3
  i) with m (even); s=0; h=0; m(mod $2^n$)=8, and using equations (5), (9), and (12):

$$\lambda\Psi = (\ldots(0\alpha^8 + \Psi(k_{m-1}\alpha^7 + k_{m-2}\alpha^6 + k_{m-3}\alpha^5 + k_{m-4}\alpha^4 + \qquad (24)$$
$$k_{m-5}\alpha^3 + k_{m-6}\alpha^2 + k_{m-7}\alpha + k_{m-8}))\alpha^8 + \ldots +$$
$$\Psi(k_7\alpha^7 + k_6\alpha^6 + k_5\alpha^5 + k_4\alpha^4 + k_3\alpha^3 + k_2\alpha^2 + k_1\alpha + k_0))$$

$$\frac{m}{8}$$

clock cycles are required to do a $2^n$-bit serial multiplication.
  ii) with m (odd); s=0; h=1; m(mod $2^n$)=7, and using equations (7), (9), and (12):

$$\lambda\Psi = (\ldots(0\alpha^8 + \Psi(0\alpha^7 + k_{m-1}\alpha^6 + k_{m-2}\alpha^5 + k_{m-3}\alpha^4 + \qquad (25)$$
$$k_{m-4}\alpha^3 + k_{m-5}\alpha^2 + k_{m-6}\alpha + k_{m-7}))\alpha^8 + \ldots +$$
$$\Psi(k_7\alpha^7 + k_6\alpha^6 + k_5\alpha^5 + k_4\alpha^4 + k_3\alpha^3 + k_2\alpha^2 + k_1\alpha + k_0))$$

$$\frac{m+1}{8}$$

clock cycles are required to do a $2^n$-bit serial multiplication.

iii) with m (even); s=1; h=2; m(mod $2^n$)=6

$$\lambda\Psi = \quad (26)$$
$$(\ldots(0\alpha^8 + \Psi(0\alpha^7 + 0\alpha^6 + k_{m-1}\alpha^5 + k_{m-2}\alpha^4 + k_{m-3}\alpha^3 + k_{m-4}\alpha^2 +$$
$$k_{m-5}\alpha + k_{m-6}))\alpha^8 + \ldots +$$
$$\Psi(k_7\alpha^7 + k_6\alpha^6 + k_5\alpha^5 + k_4\alpha^4 + k_3\alpha^3 + k_2\alpha^2 + k_1\alpha + k_0))$$

$$\frac{m+2}{8}$$

clock cycles are required to do a $2^n$-bit serial multiplication.

iv) with m (odd); s=1; h=3; m(mod $2^n$)=5

$$\lambda\Psi = (\ldots(0\alpha^8 + \Psi(0\alpha^7 + 0\alpha^6 + 0\alpha^5 + k_{m-1}\alpha^4 + \quad (27)$$
$$k_{m-2}\alpha^3 + k_{m-3}\alpha^2 + k_{m-4}\alpha + k_{m-5}))\alpha^8 + \ldots +$$
$$\Psi(k_7\alpha^7 + k_6\alpha^6 + k_5\alpha^5 + k_4\alpha^4 + k_3\alpha^3 + k_2\alpha^2 + k_1\alpha + k_0))$$

$$\frac{m+3}{8}$$

clock cycles are required to do a $2^n$-bit serial multiplication.

v) with m (even); s=2; h=4; m(mod $2^n$)=4

$$\lambda\Psi = \quad (28)$$
$$(\ldots(0\alpha^8 + \Psi(0\alpha^7 + 0\alpha^6 + 0\alpha^5 + 0\alpha^4 + k_{m-1}\alpha^3 + k_{m-2}\alpha^2 + k_{m-3}\alpha$$
$$+ k_{m-4}))\alpha^8 + \ldots +$$
$$\Psi(k_7\alpha^7 + k_6\alpha^6 + k_5\alpha^5 + k_4\alpha^4 + k_3\alpha^3 + k_2\alpha^2 + k_1\alpha + k_0))$$

$$\frac{m+4}{8}$$

clock cycles are required to do a $2^n$-bit serial multiplication.

vi) with m (odd); s=2; h=5; m(mod $2^n$)=3

$$\lambda\Psi = (\ldots(0\alpha^8 + \Psi(0\alpha^7 + 0\alpha^6 + 0\alpha^5 + 0\alpha^4 + \quad (29)$$
$$0\alpha^3 + k_{m-1}\alpha^2 + k_{m-2}\alpha + k_{m-3}))\alpha^8 + \ldots +$$
$$\Psi(k_7\alpha^7 + k_6\alpha^6 + k_5\alpha^5 + k_4\alpha^4 + k_3\alpha^3 + k_2\alpha^2 + k_1\alpha + k_0))$$

$$\frac{m+5}{8}$$

clock cycles are required to do a $2^n$-bit serial multiplication.

vii) with m (even); s=3; h=6; m(mod $2^n$)=2

$$\lambda\Psi = \quad (30)$$
$$(\ldots(0\alpha^8 + \Psi(0\alpha^7 + 0\alpha^6 + 0\alpha^5 + 0\alpha^4 + 0\alpha^3 + 0\alpha^2 + k_{m-1}\alpha + k_{m-2}))$$
$$\alpha^8 + \ldots +$$
$$\Psi(k_7\alpha^7 + k_6\alpha^6 + k_5\alpha^5 + k_4\alpha^4 + k_3\alpha^3 + k_2\alpha^2 + k_1\alpha + k_0))$$

$$\frac{m+6}{8}$$

clock cycles are required to do a $2^n$-bit serial multiplication.

viii) with m (odd); s=3; h=7; m(mod $2^n$)=1

$$\lambda\Psi = ((\ldots(\Psi k_{m-8}))\alpha^8 + \ldots + \quad (31)$$
$$\Psi(k_7\alpha^7 + k_6\alpha^6 + k_5\alpha^5 + k_4\alpha^4 + k_3\alpha^3 + k_2\alpha^2 + k_1\alpha + k_0))$$

$$\frac{m-1}{8}$$

clock cycles are required to do a $2^n$-bit serial multiplication.

Using this algorithm, any $2^n$-bit serial Galois Field GF ($2^m$) multiplier(s) can be derived for a given n and m.

It should be understood that a recursive equation can be obtained in a variety of manners which include determining them manually given the variables n and m (odd or even) or using a software algorithm which is responsive to the input variables n and m (odd or even) and which includes within the algorithm the conditions of equations 2, 5, 9, 11, 12 (for the even case) or 2, 7, 9, 11, and 12 (for the odd case).

Architecture and Operation

In the following sections, several examples of the architectures and operations of the $2^n$-bit serial multiplier over the Galois Field GF ($2^m$) are given.

a) $2^n$-bit serial multiplier over the Galois Field GF ($2^m$) with n=1 and m=4

FIG. 1 shows the architecture of the $2^n$-bit serial multiplier over the Galois Field GF ($2^m$) with n=1 and m=4, and FIG. 2 shows the logic diagram of the multiplier architecture shown in FIG. 1. It should be noted that FIG. 2 shows an expanded logic diagram of the elements shown in FIG. 1. Specifically, element U1 in FIG. 1 is representative of the parallel AND gates U1 shown in FIG. 2. Similarly in FIG. 1, U5 represents XOR gates as shown in FIG. 2. It should be further noted that the architectural diagrams shown in FIGS. 3–7 can be similarly expanded as shown in FIG. 2.

Since m=4 is an even integer and n=1, then m(mod $2^n$)=2. Using (15), the following recursive equation is resulted:

$$\lambda\psi=(0\cdot\alpha^2+\psi(k_3\alpha+k_2))\alpha^2+\psi(k_1\alpha+k_0) \quad (32)$$

ψ is found using Equation (2)

$$\psi=e_0+e_1\alpha+e_2\alpha^2+e_3\alpha^3 \quad (33)$$

As shown in FIGS. 1 and 2, the multiplier contains two 2-bit shift registers with parallel load capability to store and shift the input field element λ, a 4-bit register with parallel load and hold capabilities to hold the input field element ψ, and a 4-bit register γ, with synchronous reset capability. It also contains eight 2-input AND gates (U1 and U2), and four 3-input XOR (U5) gates.

The multiplier also includes two constant Galois Field GF ($2^4$) (U3 and U4) multipliers that perform multiplications of the field elements by $\alpha$ and $\alpha^2$, respectively. These are constant multipliers and are built with XOR gates. Implementing a constant multiplier with XOR gates is well-known in the field and is described in "Error Control Coding: Fundamentals and Applications," by Shu Lin and Daniel J. Costello, Jr., pp. 519–521, which is incorporated herein. The output of all logic elements are connected to a 4-bit bus except the $k_3$ and $k_2$ registers which are connected to a 1-bit bus. This multiplier has CLK, LOAD, $\lambda$ and $\psi$ signals and constant values as inputs and $\lambda\psi$ as outputs.

The following two steps describe the operation of the multiplier shown in FIG. 1.

Step 1) First multiplication cycle with precomputing

In the first cycle, the odd coefficients $k_1$–$k_3$ of the $\lambda$ input field element are preloaded in parallel into a 2-bit $k_1$–$k_3$ register and the even coefficients $k_0$–$k_2$ of the $\lambda$ input field element are preloaded in parallel into a 2-bit $k_0$–$k_2$ register when LOAD signal is high. Also, the coefficients $e_0$–$e_3$ of the $\psi$ input field element are preloaded in parallel into a 4-bit $\psi$ register when LOAD signal is high. The 4-bit register $\gamma$ is synchronously preloaded to zero when the LOAD signal is high. While the process is taking place, the multiplier computes the first phase of the multiplications by evaluating the following part of the recursive equation (32).

$$\lambda\psi = 0\cdot\alpha^2 + \psi(k_3\alpha+k_2) \quad (34)$$

The result of equation (34) is shifted into the 4-bit register By at the end of the first multiplication cycle.

Step 2) Second multiplication cycle

In the second cycle, the LOAD signal goes low and this puts $\lambda$ registers into a shift mode and the $\psi$ registers into hold mode. At the next rising edge of the clock CLK, the multiplier computes the final multiplications using the value stored in the $\gamma$ register in the first cycle, multiplying it by $\alpha^2$ and adding it to the last term in equation (32) as shown in equation (35).

$$\lambda\psi = (\gamma_{cycle1})\alpha^2 + \psi(k_1\alpha+k_0) \quad (35)$$

The resultant stored in the $\gamma$ register in the second cycle is the resultant of equation (32) which is also the resultant of the multiplication of the two arbitrary field elements $\beta$ and $\psi$ The $2^n$-bit serial multiplier over the Galois Field GF ($2^4$) takes 2

$$\left(\text{i.e., } \frac{m}{2}\right)$$

clock cycles to perform a multiplication.

b) $2^1$-bit serial multiplier over the Galois Field GF ($2^m$) with n=1 and m=5 i) Case 1

FIG. 3 shows the architecture of the $2^n$-bit serial multiplier over the Galois Field GF ($2^m$) with n=1 and m=5. Since m=5 is an odd integer and n=1, then m(mod $2^n$)=1. Using (18), the following recursive equation is obtained.

$$\lambda\psi = ((0\cdot\alpha^2+\psi(0\cdot\alpha+k_4))\alpha^2+\psi(k_3\alpha+k_2))\alpha^2+\psi(k_1\alpha+k_0) \quad (36)$$

Using Equation (2), $\psi$ is:

$$\psi = e_0+e_1\alpha+e_2\alpha^2+e_3\alpha^3+e_4\alpha^4 \quad (37)$$

The multiplier contains two 3-bit shift registers with parallel load capability to store and shift the input field element $\lambda$, a 5-bit register with parallel load and hold capabilities to hold the input field element $\psi$, and a 5-bit register By with synchronous reset capability.

The multiplier contains ten 2-input AND gates (U1 and U2), five 3-input XOR (U5) gates. It also includes two constant Galois Field GF ($2^5$) (U3 and U4) multipliers that perform multiplications of the field elements by constants $\alpha$ and $\alpha^2$, respectively. These are constant multipliers and are built with XOR gates as described previously. The output of all logic elements are connected to a 5-bit bus except the zero and $k_4$ registers which are connected to a 1-bit bus. This multiplier has CLK, LOAD, $\lambda$ and $\psi$ signals as inputs and $\lambda\psi$ as outputs.

The following two steps describe the multiplier operation shown in FIG. 3.

Step 1) First multiplication cycle with precomputing

In the first cycle, the odd coefficients ($k_1$, $k_3$, 0) of the $\lambda$ zero-padded input field element are preloaded in parallel into the 3-bit ($k_1$, $k_3$, 0) register and the even coefficients ($k_0$, $k_2$, $k_4$) of the $\lambda$ input field element are preloaded in parallel into the 3-bit ($k_0$, $k_2$, $k_4$) register when LOAD signal is high. Also, the coefficients $e_0$–$e_4$ of the $\psi$ input field element are preloaded in parallel into a 5-bit $\psi$ register when LOAD signal is high. The 5-bit register $\psi$ is synchronously preloaded to zero when the LOAD signal is high.

While this process is taking place, the multiplier computes the first phase of multiplications by evaluating the following part of recursive equation (36).

$$\lambda\psi = 0\cdot\alpha^2 + \psi(0\cdot\alpha+k_4) \quad (38)$$

At the end of cycle 1, the resultant of equation (38) is stored in the $\gamma$ register.

Step 2) Second multiplication cycle

In the second cycle, the LOAD signal goes low and this puts $\lambda$ registers into a shift mode and the $\psi$ registers into hold mode. At the next rising edge of the clock CLK, the multiplier computes the next second partial multiplication shown below using the value stored in the $\gamma$ register in the first cycle:

$$\lambda\psi = (\gamma_{cycle1})\alpha^2 + \psi(k_3\alpha+k_2) \quad (39)$$

At the end of cycle 2, the resultant of equation (39) is stored into the $\gamma$ register.

Step 3) Third multiplication cycle

In the third cycle, the LOAD signal stays low in order to keep the $\lambda$ registers in a shift mode and the $\psi$ registers in a hold mode. At the next rising edge of the clock CLK, the multiplier computes the final multiplication using the value stored in the $\gamma$ register in the second cycle and adding it to the last term of equation (36).

$$\lambda\psi = (\gamma_{cycle2})\alpha^2 + \psi(k_1\alpha+k_0) \quad (40)$$

The value stored in the $\gamma$ register after cycle 3 is the resultant of the equation (36) which is the resultant of the multiplication of the two arbitrary field elements $\beta$ and $\psi$.

The $2^1$-bit serial multiplier over the Galois Field, GF ($2^5$) takes 3

$$\left(\text{i.e., } \frac{m+1}{2}\right)$$

clock cycles to perform a multiplication.

ii) Case 2

FIG. 4 shows the architecture of the $2^n$-bit serial multiplier over the Galois Field GF ($2^m$) with n=1 and m=5. Since m=5 is an odd integer and n=1, then m(mod $2^n$)=1. Note the variables for this multiplication operation are the same as in Case 1. However, instead of using equation (18) as in Case 1, the simplified equation (19) is used and the following recursive equation is obtained.

$$\lambda\psi=(\psi k_4\alpha^2+\psi(k_3\alpha+k_2))\alpha^2+\psi(k_1\alpha+k_0) \qquad (41)$$

Using Equation (2), $\psi$ is:

$$\psi=e_0+e_1\alpha+e_2\alpha^2+e_3\alpha^3+e_4\alpha^4 \qquad (42)$$

The multiplier contains two 2-bit shift registers with parallel load capability to store and shift the input field element $\lambda$, a 5-bit register with parallel load and hold capabilities to hold the input field element $\psi$, and a 5-bit register $\gamma$ with synchronous reset and parallel load capability.

The multiplier also contains fifteen 2-input AND gates (U1, U2, and U6), five 3-input XOR (U5) gates, and two constant Galois Field GF ($2^5$) (U3 and U4) multipliers that perform multiplications of the field elements by constants $\alpha$ and $\alpha^2$, respectively. These are constant multipliers and are built with XOR gates as described above. The output of all logic elements are connected to a 5-bit bus except the $k_3$ and $k_2$ registers which are connected to a 1-bit bus. This multiplier has CLK, LOAD, $\lambda$ and $\psi$ signals as inputs and $\lambda\psi$ as outputs.

The following two steps describe the multiplier operation shown in FIG. 4.

Step 1) First multiplication cycle with precomputing

The odd coefficients $k_1$–$k_3$ of the $\lambda$ input field element are preloaded in parallel into a 2-bit $k_1$–$k_3$ register and the even coefficients $k_0$–$k_2$ of the $\lambda$ input field element are preloaded in parallel into a 2-bit $k_0$–$k_2$ register when LOAD signal is high. Also, the coefficients $e_0$–$e_4$ of the $\psi$ input field element are preloaded in parallel into a 5-bit $\psi$ register when LOAD signal is high. The 5-bit register $\gamma$ is synchronously preloaded with the highest order coefficient in equation (41), $\psi k_4$, when the LOAD signal is high, instead of being preloaded with "0" as in Case 1.

While this process is taking place, the multiplier computes the first phase of multiplications by evaluating the following part of recursive equation (41).

$$\lambda\psi=\psi k_4\alpha^2+\psi(k_3\alpha+k_2) \qquad (43)$$

The resultant is then stored in the $\gamma$ register.

Step 2) Second multiplication cycle

In the second cycle, the LOAD signal goes low and this puts $\lambda$ registers into a shift mode and the $\psi$ registers into hold mode. At the next rising edge of the clock CLK, the multiplier computes the final multiplications.

$$\lambda\psi=(\gamma_{cycle1})\alpha^2+\psi(k_1\alpha+k_0) \qquad (44)$$

The value stored in the $\gamma$ register after this cycle is the resultant of the multiplication of the two arbitrary field elements $\beta$ and $\psi$.

The $2^1$-bit serial multiplier over the Galois Field, GF ($2^5$) takes 2

$$\left(\text{i.e.,}\ \frac{m-1}{2}\right)$$

clock cycles to perform a multiplication.

c) $2^1$-bit serial multiplier with n=1 over the Galois Field, GF ($2^{10}$)

FIG. 5 shows the architecture of the $2^n$-bit serial multiplier with n=1 over the Galois Field, GF ($2^{10}$). Since m=10 is an even integer and n=1, then m(mod $2^n$)=2. Using (15), the following recursive equation is obtained:

$$\lambda\Psi = ((((0\cdot\alpha^2 + \Psi(k_9\alpha + k_8))\alpha^2 + \Psi(k_7\alpha + k_6))\alpha^2 + \Psi(k_5\alpha + k_4))\alpha^2 + \qquad (45)$$
$$\Psi(k_3\alpha + k_2))\alpha^2 + \Psi(k_1\alpha + k_0)$$

Using equation (2), $\psi$ is $$\Psi = e_0 + e_1\alpha^1 + e_2\alpha^2 + e_3\alpha^3 + \qquad (46)$$
$$e_4\alpha^4 + e_5\alpha^5 + e_6\alpha^6 + e_7\alpha^7 + e_8\alpha^8 + e_9\alpha^9$$

The multiplier contains two 4-bit shift registers with parallel load capability to store and shift the input field element $\lambda$, a 10-bit register with parallel load and hold capability to hold the input field element $\psi$, and a 10-bit register $\gamma$ with synchronous reset capability. It also contains twenty 2-input AND gates (U1 and U2), and ten 3-input XOR (U5) gates. The multiplier has two Galois Field, GF ($2^{10}$), U3 and U4 multipliers that perform multiplications of the field elements by $\alpha^1$ and $\alpha^2$, respectively. These are constant multipliers and are built from XOR gates. The output of all logic elements are connected to a 10-bit bus except the $k_9$ and $k_8$ registers which are connected to a 1-bit bus. This multiplier has CLK, LOAD, $\lambda$, and $\psi$ signals as inputs and $\lambda\psi$ as outputs.

The multiplier takes the following steps to perform a multiplication operation shown in FIG. 5.

Step 1) First Multiplication Cycle with Precomputing

The odd coefficients $k_1$–$k_9$ of the $\lambda$ input field element are preloaded in parallel into a 5-bit $k_1$–$k_9$ register and the even coefficients $k_0$–$k_8$ of the $\lambda$ input field element are preloaded in parallel into a 5-bit $k_0$–$k_8$ register when LOAD signal is high. Also, the coefficients $e_0$–$e_9$ of the $\psi$ input field element are preloaded in parallel into a 10-bit $\psi$ register when LOAD signal is high. The 10-bit register $\gamma$ is synchronously preloaded to zero when the LOAD signal is high. While this process is taking place, the multiplier performs the first phase of multiplications by evaluating the following part of recursive equation (45) which is given as:

$$\lambda\psi=0\cdot\alpha^2+\psi(k_9\alpha+k_8) \qquad (47)$$

The resultant of this equation is stored in $\gamma$ register after the first cycle.

Step 2) Second Multiplication Cycle

In the second cycle, the LOAD signal goes low and this puts $\lambda$ registers into a shift mode and the $\psi$ registers into hold mode. At the next rising edge of the clock CLK. the multiplier performs the following partial multiplication of equation (45):

$$\lambda\psi=(\gamma\text{cycle1})\alpha^2+\psi(k_1\alpha+k_6) \qquad (48)$$

The resultant of this equation is stored in the $\gamma$ register after the second cycle.

Step 3) Third Multiplication Cycle

At the next rising edge of the clock CLK, the multiplier performs the following partial multiplications:

$$\lambda\psi=(\gamma_{cycle2})\alpha^2+\psi(k_5\alpha+k_4) \qquad (49)$$

The resultant of this equation is stored in the $\gamma$ register after the third cycle.

Step 4) Fourth Multiplication Cycle

At the next rising edge of the clock CLK, the multiplier performs the following partial multiplications:

$$\lambda\psi=(\gamma_{cycle3})\alpha^2+\psi(k_3\alpha+k_2) \quad (50)$$

Step 5) Fifth Multiplication Cycle

In the fifth cycle, the multiplier completes the multiplications with the following result:

$$\lambda\psi=(\gamma_{cycle4})\alpha^2+\psi(k_1\alpha+k_0) \quad (51)$$

The value stored in the $\gamma$ register after the fifth cycle is the resultant of the multiplication of arbitrary field elements $\beta$ and $\psi$.

The $2^n$-bit serial multiplier with n=1 over the Galois Field, GF $(2^{10})$ takes 5 clock cycles $$\left(\text{i.e.,} \frac{m}{2}\right)$$

to perform a multiplication.

d) $2^n$-Bit Serial Multiplier With n=2 Over the Galois Field GF $(2^{10})$

FIG. 6 shows the architecture of the $2^n$-bit serial multiplier with n=2 over the Galois Field GF $(2^{10})$. Since m=10 is an even integer and n=2, then m(mod $2^{10}$)=2. Using (22), the following recursive equation is obtained:

$$\lambda\Psi = ((0\cdot\alpha^4 + \Psi(0\cdot\alpha^3 + 0\cdot\alpha^2 + k_9\alpha + k_8))\alpha^4 + \quad (52)$$
$$\Psi(k_7\alpha^3 + k_6\alpha^2 + k_5\alpha + k_4))\alpha^4 + \Psi(k_3\alpha^3 + k_2\alpha^2 + k_1\alpha + k_0)$$

Using equation (2), $\psi$ is $$\Psi = e_0 + e_1\alpha^1 + e_2\alpha^2 + e_3\alpha^3 + \quad (53)$$
$$e_4\alpha^4 + e_5\alpha^5 + e_6\alpha^6 + e_7\alpha^7 + e_8\alpha^8 + e_9\alpha^9$$

The multiplier contains four 3-bit shift registers with parallel load capability to store and shift the input field element $\lambda$, a 10-bit register with parallel load and hold capability to hold the input field element $\psi$, and a 10-bit register By with synchronous reset capability. It also contains forty 2-input AND gates (U1, U2, U3, and U4), and ten 5-input XOR (U9) gates. The multiplier has four Galois Field, GF $(2^{10})$, multipliers (U5, U6, U7, and U8) that perform multiplications of the field elements by $\alpha^1$, $\alpha^2$, $\alpha^3$, and $\alpha^4$, respectively. These are constant multipliers and are built from XOR gates as described herein. The output of all logic elements are connected to a 10-bit bus except the $k_9$–$k_8$ and zero-padded registers which are connected to a 1-bit bus. This multiplier has CLK, LOAD, $\lambda$, and $\psi$ signals as inputs and $\lambda\psi$ as outputs.

The multiplier takes the following steps to perform a multiplication operation shown in FIG. 6.

Step 1) First Multiplication Cycle with Precomputing

The coefficients $(k_0, k_4, k_8)$ of the $\lambda$ input field element are preloaded in parallel into a 3-bit register, $(k_0, k_4, k_8)$; the coefficients $(k_1, k_5, k_9)$ of the $\lambda$ input field element are preloaded in parallel into a 3-bit register, $(k_1, k_5, k_9)$; the coefficients $(k_2, k_6, 0)$ of the $\lambda$ input field element are preloaded in parallel into a 3-bit register, $(k_2, k_6, 0)$; the coefficients $(k_3, k_7, 0)$ of the $\lambda$ input field element are preloaded in parallel into a 3-bit register, $(k_3, k_7, 0)$, when LOAD signal is high. Also, the coefficients $e_0$–$e_9$ of the $\psi$ input field element are preloaded in parallel into a 10-bit $\psi$ register when LOAD signal is high. The 10-bit register $\gamma$ is synchronously preloaded to zero when the LOAD signal is high.

While this process is taking place, the multiplier performs the first phase of multiplications by evaluating the following part of recursive equation (52) which is given as:

$$\lambda\psi=0\cdot\alpha^4+\psi(0\cdot\alpha^3+0\cdot\alpha^2+k_9\alpha+k_8) \quad (54)$$

The resultant is then stored in the $\gamma$ register.

Step 2) Second Multiplication Cycle

In the second cycle, the LOAD signal goes low and this puts $\lambda$ registers into a shift mode and the $\psi$ registers into hold mode. At the next rising edge of the clock CLK, the multiplier performs the following partial multiplications:

$$\lambda\psi=(\gamma_{cycle1})\alpha^4+\psi(k_1\alpha^3+k_6\alpha^2+k_5\alpha+k_4) \quad (55)$$

Step 3) Third Multiplication Cycle

At the next rising edge of the clock CLK, the multiplier performs the following partial multiplications:

$$\lambda\psi=(\gamma_{cycle2})\alpha^4+\psi(k_3\alpha^3+k_2\alpha^2+k_1\alpha+k_0) \quad (56)$$

The resultant stored in the $\gamma$ register is the product of equation (52).

The $2^n$-bit serial multiplier with n=2 over the Galois Field, GF $(2^{10})$ takes three $$\left(\text{i.e.,} \frac{m+2}{4}\right)$$

clock cycles to perform a multiplication.

e) $2^n$-Bit Serial Multiplier with n=3 over the Galois Field GF $(2^{10})$

FIG. 7 shows the architecture of the $2^n$-bit serial multiplier with n=3 over the Galois Field GF $(2^{10})$. Since m=10 is an even integer and n=3, then m(mod $2^n$)=2. Using (30), the following recursive equation is obtained:

$$\lambda\Psi = \quad (57)$$
$$((0\cdot\alpha^8 + \Psi(0\cdot\alpha^7 + 0\cdot\alpha^6 + 0\cdot\alpha^5 + 0\cdot\alpha^4 + 0\cdot\alpha^3 + 0\cdot\alpha^2 + k_9\alpha +$$
$$k_8))\alpha^8 +$$
$$\Psi(k_7\alpha^7 + k_6\alpha^6 + k_5\alpha^5 + k_4\alpha^4 + k_3\alpha^3 + k_2\alpha^2 + k_1\alpha + k_0))$$

Using equation 2, $\psi$ is $$\Psi = e_0 + e_1\alpha^1 + e_2\alpha^2 + e_3\alpha^3 + \quad (58)$$
$$e_4\alpha^4 + e_5\alpha^5 + e_6\alpha^6 + e_7\alpha^7 + e_8\alpha^8 + e_9\alpha^9$$

The multiplier contains eight 2-bit shift registers with parallel load capability to store and shift the input field element $\lambda$, a 10-bit register with parallel load and hold capability to hold the input field element $\psi$, and a 10-bit register By with synchronous reset capability. It also contains eighty 2-input AND gates (U1, U2, U3, U4, U5, U6, U7, and U8), and ten 9-input XOR (U5) gates. The multiplier has eight Galois Field, GE $(2^{10})$, (U8, U9, U10, U11, U12, U13, U14, and U15) multipliers that perform multiplications of the field elements by, $\alpha^1$, $\alpha^2$, $\alpha^3$, $\alpha^4$, $\alpha^5$, $\alpha^6$, $\alpha^7$, and $\alpha^8$, respectively. These are constant multipliers and are built from XOR gates. The output of all logic elements are connected to a 10-bit bus except the $k_9$–$k_8$, and zero-padded registers which are connected to a 1-bit bus. This multiplier has CLK, LOAD, $\lambda$, and $\psi$ signals as inputs and $\lambda\psi$ as outputs.

The multiplier takes the following steps to perform a multiplication operation shown in FIG. 7.

Step 1) First Multiplication Cycle with Precomputing

The coefficients $(k_0, k_8)$ of the $\lambda$ input field element are preloaded in parallel into a 2-bit register, $(k_0, k_8)$; the coefficients ($k_1$, $k_9$) of the $\lambda$ input field element are preloaded in parallel into a 2-bit register, ($k_1$, $k_9$); the coefficients ($k_2$, 0) of the $\lambda$ input field element are preloaded in parallel into a 2-bit register, ($k_2$, 0); the coefficients ($k_3$, 0) of the $\lambda$ input field element are preloaded in parallel into a 2-bit register, ($k_3$, 0); the coefficients ($k_4$, 0) of the $\lambda$ input field element are preloaded in parallel into a 2-bit register, ($k_4$, 0); the coefficients ($k_5$, 0) of the $\lambda$ input field element are preloaded in parallel into a 2-bit register, ($k_5$, 0); the coefficients ($k_6$, 0) of the $\lambda$ input field element are preloaded in parallel into a 2-bit register, ($k_6$, 0); and the coefficients ($k_7$, 0) of the $\lambda$ input field element are preloaded in parallel into a 2-bit register, ($k_7$, 0), when LOAD signal is high. Also, the coefficients $e_0$–$k_9$ of the $\psi$ input field element are preloaded in parallel into a 10-bit $\psi$ register when LOAD signal is high. The 10-bit register $\gamma$ are synchronously preloaded to zero when the LOAD signal is high.

While this process is taking place, the multiplier performs the first phase of multiplications by evaluating the following part of recursive equation (57) which is given as:

$$\lambda\psi = 0\cdot\alpha^8 + \psi(0\cdot\alpha^7 + 0\cdot\alpha^6 + 0\cdot\alpha^5 + 0\cdot\alpha^4 + 0\cdot\alpha^3 + 0\cdot\alpha^2 + k_9\alpha + k_8) \quad (59)$$

which is stored in the $\gamma$ register.

Step 2) Second Multiplication Cycle

In the second cycle, the LOAD signal goes low and this puts $\lambda$ registers into a shift mode and the $\psi$ registers into hold mode. At the next rising edge of the clock CLK, the multiplier performs the following partial multiplications:

$$\lambda\psi(\gamma_{cycle1})\alpha^8 + \psi(k_7\alpha^7 + k_6\alpha^6 + k_5\alpha^5 + k_4\alpha^4 + k_3\alpha^3 + k_2\alpha^2 + k_1\alpha + k_0) \quad (60)$$

The resultant of equation (60) is stored in the $\gamma$ register and is the resultant of the multiplication of the two arbitrary field elements $\beta$ and $\psi$.

The $2^n$-bit serial multiplier with n=3 over the Galois Field, GF ($2^{10}$) takes two clock cycles $$\left(\text{i.e., } \frac{m+6}{8}\right)$$

to perform a multiplication.

Table 1 shows the multiplication cycles of the $2^n$-bit serial multiplier over the Galois Field GF ($2^m$) for $1 \leq m \leq 16$ and $1 \leq n \leq 3$. It is derived using the novel algorithm described before. It shows different configurations of the $2^n$-bit serial multipliers than can be used to yield an optimum performance and silicon area for a given m.

The $2^n$-bit serial multiplier over the Galois Field GF ($2^m$) becomes a bit parallel (fully combinational logic) multiplier for n=1 and m=1–2; n=2 and m=1–4; n=3 and m=1–8. This is due to the fact that no registers are required for storing the input field element coefficients (i.e., zero cycle multiplications).

In general, the number of multiplication cycles is (m+h)/$2^n$ where h={$2^n$'m (mod $2^n$)}. However, if m is odd and m(mod $2^n$)=1, the number of multiplication cycles is reduced to (m−1)/$2^n$.

In general, the $2^n$-bit serial multiplier requires (3m) registers with parallel load feature, (m·$2^n$) 2-input AND gates, m ($2^n$+1)-input XOR gates, and $\alpha^{2^p}$ constant Galois Field multipliers where p=0, 1, . . . n.

TABLE 1

The multiplication cycles of the $2^n$-bit serial multiplier over the Galois Field GF ($2^m$)

| # Cycles | $2^n$-Bit Serial, n = 1 | $2^n$-Bit Serial, n = 2 | $2^n$-Bit Serial, n = 3 |
|---|---|---|---|
| m = 1 | 0 | 0 | 0 |
| m = 2 | 0 | 0 | 0 |
| m = 3 | 2 | 0 | 0 |
| m = 4 | 2 | 0 | 0 |
| m = 5 | 2 | 1 | 0 |
| m = 6 | 3 | 2 | 0 |
| m = 7 | 3 | 2 | 0 |
| m = 8 | 4 | 2 | 0 |
| m = 9 | 4 | 2 | 1 |
| m = 10 | 5 | 3 | 2 |
| m = 11 | 5 | 3 | 2 |
| m = 12 | 6 | 3 | 2 |
| m = 13 | 6 | 3 | 2 |
| m = 14 | 7 | 4 | 2 |
| m = 15 | 7 | 4 | 2 |
| m = 16 | 8 | 4 | 2 |

In the preceding description, numerous specific details are set forth, such as specific input element definitions in order to provide a thorough understanding of the present invention. It will be apparent, however, to one skilled in the art that these specific details need not be employed to practice the present invention. In other instances, well-known logic structures and components have not been described in order to avoid unnecessarily obscuring the present invention.

Moreover, although the components of the present invention have been described in conjunction with certain embodiments, it is appreciated that the invention can be implemented in a variety of other ways. Consequently, it is to be understood that the particular embodiments shown and described by way of illustration is in no way intended to be considered limiting. Reference to the details of these embodiments is not intended to limit the scope of the claims which themselves recite only those features regarded as essential to the invention.

What is claimed is:

1. A system for performing a binary multiplication operation between first and second field elements in a Galios field including field elements, said system comprising:

means for restructuring a mathematical representation of said first field element dependent on whether said first field element has one of an associated odd and even bit length;

means for determining a zero-padded field element for adding to said restructured mathematical representation of said first field element to obtain a modified first field element;

means for recursively structuring a multiplication operation between said modified first field element and said second field element to obtain a recursive mathematical representation of said multiplication operation, said recursive mathematical representation having an odd set of coefficients and an even set of coefficients and having an associated highest order coefficient;

first shift registers for storing said odd set of coefficients during a first clock cycle, wherein said odd coefficients are serially outputted from said first register one coefficient per clock cycle;

second shift registers for storing said even set of coefficients during said first clock cycle, wherein said even coefficients are serially outputted from said first register one coefficient per clock cycle;

third register for storing second coefficients associated with said second field element during said first clock cycle, said second coefficients being parallely outputted from said third register;

destination register for being preloaded with one of a zero value and said associated highest order coefficient at the beginning of said first clock cycle and for storing a current resultant logic operation value subsequent to said beginning of said first clock cycle;

means for performing logic operations in at least one clock cycle with said first and second coefficients, at least one constant value, and a currently stored value in said destination register to obtain in each of said at least one clock cycle said current resultant logic operation value for each of said at least one clock cycle;

storing said new current resultant logic operation value in said destination register for said each clock cycle.

2. The system as described in claim 1 wherein said logic operaiton means includes:

a set of AND gates coupled to said first and second shift registers and said third register, said first set of AND gates outputting, in said each clock cycle, first data representing the multiplication product of coefficients from said first and second registers with said third register;

constant multipliers for outputting, in said each clock cycle, second data representing the multiplication of said first data by said at least one constant;

a set of XOR gates coupled to said set of AND gates and said constant multipliers, for outputting, in said each clock cycle, fourth data representing the addition of said first, said second, and said third data.

3. The system as described in claim 1 wherein said multiplication operation is performed in $(m+h)/2^n$ clock cycles where $h=\{2^n-m(\bmod 2^n)\}$ and m is the length of said field elements and n is one of a positive and negative integer and wherein when m is odd and $m(\bmod 2^n)=1$, said multiplication operation is performed in $(m-1)/2^n$ clock cycles.

4. The system as described in claim 1 wherein said first and second shift registers, said third registers, and said destination register are each coupled to a clock signal and load signal, wherein during said each clock cycle, when said load signal is in a first state, said first and second shift registers are in shift mode while said third register is in a hold mode and when said load signal is in a second state, said first and second shift registers and said third register are parallely preloaded with said odd set of coefficients, said even set of coefficients, and said second coefficients respectively.

5. The system as described in claim 1 wherein said field elements have a length m and wherein said Galios field is a $GF(2^m)$ Galios field.

6. The system as described in claim 1 wherein said first and second registers and said third registers comprise 3m bits of registers having parallel load capability, said set of AND gates comprise $(m2^n)$ 2-input AND gates, and said set of XOR gates comprise $m(2^n+1)$-input XOR gates wherein said first and second field elements have a length of m and wherein said multiplication operation is a $2^n$-bit serial mulitplication operation.

7. A method for performing a binary multiplication operation between first and second field elements in a Galios field including field elements, said method comprising the steps of:

restructuring a mathematical representation of said first field element dependent on whether said first field element has one of an associated odd and even bit length;

determining a zero-padded field element for adding to said restructured mathematical representation of said first field element to obtain a modified first field element;

recursively structuring a multiplication operation between said modified first field element and said second field element to obtain a recursive mathematical representation of said multiplication operation, said recursive mathematical representation having an odd set of coefficients and an even set of coefficients and having an associated highest order coefficient;

preloading said odd set of coefficients into first shift registers in a first clock cycle;

preloading said even set of coefficients into second shift registers in said first clock cycle;

preloading second coefficients associated with said second field element into a third register in said first clock cycle;

preloading a value into a destination register in said first clock cycle, said value being one of a zero value, said associated highest order coefficient, and a resultant logic operation value;

serially outputting from said first and second shift register one coefficient per clock cycle;

parallely outputting said second coefficients from said third register during each clock cycle;

performing logic operations in at least one clock cycle with said first and second coefficients, at least one constant value, and said stored value in said destination register to obtain a current resultant logic operation value for said each clock cycle; and storing said current resultant logic operation value in said destination register for said each clock cycle.

8. The method as described in claim 7 wherein said at least one clock cycle is $(m+h)/2^n$ clock cycles where $h=\{2^n-m(\bmod 2^n)\}$ and m is the length of said field elements and n is a positive integer and wherein when m is odd and $m(\bmod 2^n)=1$, said at least one clock cycle is $(m-1)/2^n$ clock cycles.

9. The method as described in claim 7 wherein each of said first and second shift registers, said third registers and said destination register are responsive to a clock signal and load signal, wherein during said each clock cycle said method further includes the steps of:

shifting data from said first and second shift registers in a serial manner and holding data in said third register when said load signal is in a first state; and preloading said first and second shift registers and said third register parallely with said odd set of coefficients, said even set of coefficients, and said second coefficients, respectively, during said first clock cycle when said load signal is in a second state.

* * * * *